(12) United States Patent
Schlemmer et al.

(10) Patent No.: US 9,359,903 B2
(45) Date of Patent: Jun. 7, 2016

(54) GAS TURBINE AND GUIDE BLADE FOR A HOUSING OF A GAS TURBINE

(71) Applicant: MTU Aero Engines GmbH, Munich (DE)

(72) Inventors: Markus Schlemmer, Mainburg/Wambach (DE); Marcin Rozak, Jaroslaw (PL)

(73) Assignee: MTU Aero Engines AG, Munich (DE)

( * ) Notice: Subject to any disclaimer, the term of this patent is extended or adjusted under 35 U.S.C. 154(b) by 649 days.

(21) Appl. No.: 13/793,802

(22) Filed: Mar. 11, 2013

(65) Prior Publication Data
US 2014/0154085 A1 Jun. 5, 2014

(30) Foreign Application Priority Data

Mar. 12, 2012 (EP) ..................................... 12159013

(51) Int. Cl.
*F01D 5/30* (2006.01)
*F01D 5/22* (2006.01)
(Continued)

(52) U.S. Cl.
CPC ................ *F01D 5/225* (2013.01); *F01D 9/041* (2013.01); *F01D 11/005* (2013.01); *F01D 25/246* (2013.01); *F04D 29/542* (2013.01); *F04D 29/644* (2013.01); *F05D 2240/55* (2013.01);
(Continued)

(58) Field of Classification Search
CPC ..... F04D 29/644; F04D 29/542; F01D 9/041; F01D 11/005; F01D 25/246; F01D 5/225; F05D 2240/55; F05D 2260/60; F05D 2260/205; F05D 2260/201; Y10T 29/49336; Y02T 50/673; Y02T 50/676

USPC ....................................... 416/212 A; 29/889.7
See application file for complete search history.

(56) References Cited

U.S. PATENT DOCUMENTS

| 4,767,260 | A | * | 8/1988 | Clevenger et al. ............ 415/115 |
| 6,227,798 | B1 | | 5/2001 | Demers et al. |
| 2009/0129917 | A1 | * | 5/2009 | Hazevis et al. ............ 415/173.1 |
| 2012/0257954 | A1 | | 10/2012 | Chanteloup et al. |

FOREIGN PATENT DOCUMENTS

| DE | 1042828 | * 11/1958 | .......... F04D 27/0253 |
| FR | 2954401 | 6/2011 | |
| GB | 799675 | 8/1958 | |

OTHER PUBLICATIONS

Leishman et al: "Mechanism of the interaction of a ramped bleed slot with the primary flow," Proceedings of GT2005 ASME Turbo Expo 2005: Power for Land, Sea and Air Jun. 6-9, 2005, Reno-Tahoe, Nevada, USA, 12 pages.

(Continued)

*Primary Examiner* — Zelalem Eshete
(74) *Attorney, Agent, or Firm* — Davidson, Davidson & Kappel, LLC

(57) ABSTRACT

A gas turbine, in particular an aircraft engine, having a housing in which at least one guide blade (12) is situated, the guide blade (12) including at least one shroud configuration (21) having a radially outer shroud (16) and having a shroud holding device (23) with the aid of which the shroud (16) is secured on the housing, as well as including a turbine blade (18) extending radially inward from the shroud configuration (21). The shroud holding device (23) or parts thereof include(s) at least one air passage channel (28), which permits a flow passage through the shroud holding device (23). The invention also relates to a guide blade (12) for placement on a housing of a gas turbine as well as a method for manufacturing such a guide blade (12).

13 Claims, 2 Drawing Sheets

(51) Int. Cl.
*F01D 9/04* (2006.01)
*F01D 11/00* (2006.01)
*F01D 25/24* (2006.01)
*F04D 29/54* (2006.01)
*F04D 29/64* (2006.01)

(52) U.S. Cl.
CPC ..... *F05D 2260/201* (2013.01); *F05D 2260/205* (2013.01); *F05D 2260/60* (2013.01); *Y02T 50/673* (2013.01); *Y02T 50/676* (2013.01); *Y10T 29/49336* (2015.01)

(56) References Cited

OTHER PUBLICATIONS

Wellbron et al.: Bleed Flow interactions with an axial-flow compressor poerstream,: AIAA/ASME/SAE/ASEE Joint propulsion conference & Exhibit, Jul. 2002, Indianappolis, Indiana.

Leishman et al.: Effects of bleed rate and endwall location on the aerodynamic behavious of a circular hole bleed off-take, Proceedings of ASME Turbo Expo 2004: Power for Land, Sea and Air Jun. 14-17, 2004, Vienna, Austria, 14 pages.

* cited by examiner

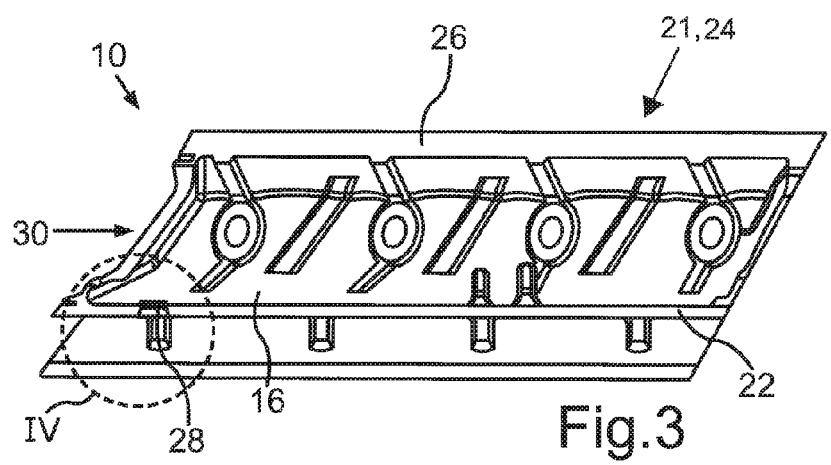
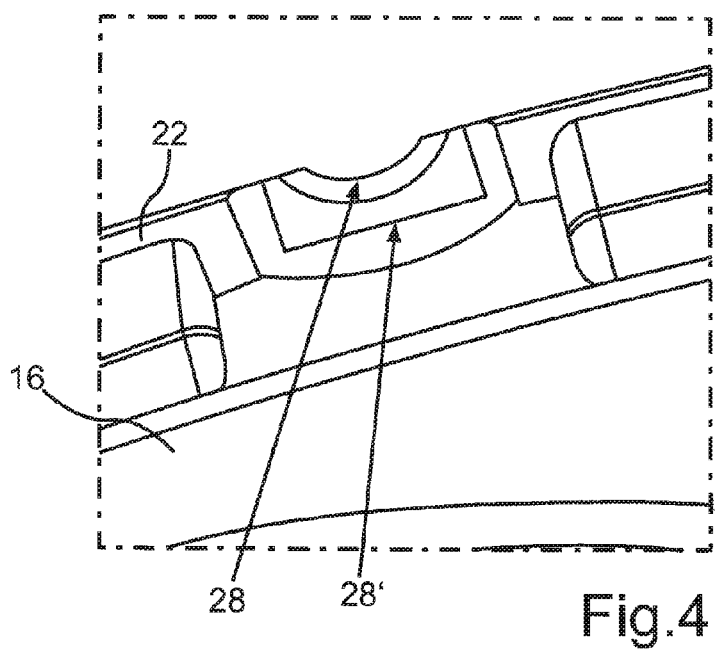

GAS TURBINE AND GUIDE BLADE FOR A HOUSING OF A GAS TURBINE

This claims the benefit of European Patent Application EP12159013.7, filed Mar. 12, 2012 and hereby incorporated by reference herein.

The present invention relates to a gas turbine, in particular an aircraft engine having a housing and at least one guide blade situated in the housing. The present invention also relates to a guide blade for placement on a housing of a gas turbine and a method for manufacturing a guide blade for a housing of a gas turbine.

BACKGROUND

In gas turbines with axial flow such as aircraft engines, guide blades and moving blades are usually situated in alternation one after the other in a housing in the compressor and turbine stages. Moving blades form the moving and rotating part of the gas turbine via which the flowing operating medium is either compressed or depressurized. With the aid of guide blades, the flow created by the moving blades may be forwarded in a defined manner. Guide blades for gas turbines usually include, in addition to a turbine blade, at least one radially outer shroud, which is situated on the turbine blade of the guide blade and forms an aerodynamic flow path limitation for the operating medium of the gas turbine in the area of the housing wall. The radially outer shroud has a surface area running essentially perpendicularly to the surface of the turbine blade. On the side of the shroud facing away from the aerodynamic flow path, guide blades often include shroud holding devices with the aid of which the guide blades are secured on the housing in the area of their radially outer shroud.

The fact that targeted gas admission to sections of the housing not situated directly in the flow path of the operating medium is comparatively difficult to accomplish during operation of the gas turbine may be regarded as a disadvantage of the known gas turbines.

SUMMARY OF THE INVENTION

It is an object of the present invention to provide a gas turbine that can permit an improved gas admission to housing areas not situated directly in the flow path of the operating medium during operation. Another alternate or additional object of the present invention is to create a guide blade for a housing of such a gas turbine and a method for manufacturing such a guide blade.

The present invention provides a gas turbine, a guide blade and a method for manufacturing a guide blade for a housing of a gas turbine. A gas turbine according to the present invention has at least one guide blade situated in a housing and having a shroud configuration as well as a turbine blade extending radially inward from the shroud configuration. The shroud configuration has a radially outer shroud and a shroud holding device with the aid of which the shroud is secured on the housing. An improved gas admission to housing areas not situated directly in the flow path of the operating medium is made possible according to the present invention by the fact that the shroud holding device or parts thereof are surrounded by at least one air passage channel which permits a flow passage through the shroud holding device in the area of the outer shroud. The geometric design and the position of the air passage channel in the housing may be optimized for the particular intended purpose. The geometric design and contour of the air passage channel are fundamentally unlimited.

In addition, multiple air passage channels may be distributed over the circumference of the housing, thus permitting a particularly precisely adjustable air and gas throughput. The air passage channel permits in particular an improved gas admission and cooling of additional housing components such as, for example, guide blade rings situated downstream and the like. The gas turbine may be designed as an aircraft engine, for example.

Additional advantages are obtained in that the shroud holding device includes at least one shroud hook on a side of the shroud opposite the turbine blade, with the aid of which the shroud is secured on the housing. The shroud hook may fundamentally include one or more air passage channels or may be designed to be free of air passage channels. In addition, it may be provided for the shroud holding device to include two or more shroud hooks, so that a particularly mechanically stable connection of the guide blade to the housing is made possible.

In another advantageous embodiment of the present invention, it is provided that the air passage channel is designed in the form of a slot and/or having a circular arc shape and/or an elliptical arc shape and/or a rectangular and/or circular and/or elliptical cross-section in at least some areas. This permits particularly good control of the air and gas throughput. In addition, these designs of the air passage channel permit a reduction in the stress concentrations on the radially outer shroud.

Additional advantages can be obtained in that the shroud configuration is designed in one piece with the turbine blade and/or is attached to the turbine blade. In this way, the guide blade may be designed to be particularly flexible and secured on the housing.

In another advantageous embodiment of the present invention, it is provided that multiple guide blades are interconnected via their shroud configurations and form a guide blade segment and/or a guide blade ring. The number of joints/gaps and thus also the gap losses are reduced in relation to individual blades in that multiple guide blades are combined into one segment or one cluster having two or more blades per unit. Less attack area is available to the aggressive hot gases, which improves the durability on the whole. The situation is similar for a complete guide blade ring. The guide blades form mechanically stable units due to their connection, so that relative movements and wear are reduced.

Additional advantages can be obtained in that at least two adjacent shroud holding devices each include a groove in which a sealing element is situated in a form-locked manner. Therefore neighboring shroud holding devices or guide blades may be joined together by a type of tongue-and-groove connection, so that a sealing plate, for example, may be used as the sealing element.

In another embodiment, it may be provided that the sealing element includes at least one air passage channel The air throughput may take place here in the connecting area of two guide blades but the air passage channel in the sealing element is to be designed in such a way that there is no flow passage through the shroud during operation of the gas turbine but instead only through the shroud holding device.

In another advantageous embodiment, the housing of the gas turbine includes a gas guidance system with the aid of which gas passing through the air passage channel during operation of the gas turbine is guided to housing components situated downstream from the air passage channel with respect to a predefined direction of flow of the housing. For example, the leakage flow which is adjustable in a targeted manner with the aid of the at least one air passage channel may be used for gas admission to additional guide blade stages, holders and the like situated on the housing.

Additional advantages can be obtained in that the at least one guide blade is situated in the area of a compressor and/or in the area of a turbine. In this way, the advantages of the guide blades described above such as the improved gas admission and cooling of additional housing components may optionally be implemented on the compressor side and/or on the turbine side of the gas turbine. The at least one guide blade is therefore built into the housing area of the compressor or of the turbine and guides the working medium onto the moving blades of the compressor and/or of the turbine during operation of the gas turbine.

Another aspect of the present invention relates to a guide blade for placement on a housing of a gas turbine, the guide blade having a shroud configuration which includes a radially outer shroud in the installed state and a shroud holding device, with the aid of which the shroud is securable on the housing. In addition, the guide blade according to the present invention has a turbine blade extending radially inward from the shroud configuration. According to the present invention, an improved gas admission to areas of a corresponding housing of a gas turbine not situated directly in the flow path of the operating medium is made possible by the fact that the shroud holding device or parts thereof include(s) at least one air passage channel which permits a flow passage through the shroud holding device in the installed state of the guide blade. The resulting advantages are to be found in the preceding description of the housing according to the present invention.

In one advantageous embodiment of the present invention, it is provided that the guide blade together with at least one and preferably three additional guide blades forms a guide blade segment. The number of joints/gaps and thus also the gap losses are reduced in relation to individual blades in that multiple guide blades are combined to form one segment or one cluster having two or more blades per unit. Less attack area is also offered to the aggressive hot gases, which improves durability on the whole. The guide blades form mechanically stable units due to their connection, so that relative movements and wear are reduced. Furthermore, the segments may be joined together easily to form a complete guide blade ring.

Another aspect of the present invention relates to a method for manufacturing a guide blade for a housing of a gas turbine, the guide blade including a shroud configuration having a radially outer shroud in the installed state and having a shroud holding device with the aid of which the shroud is securable on the housing. In addition, the guide blade includes a turbine blade extending radially inward from the shroud configuration. According to the present invention, an improved gas admission to areas of a corresponding housing of a gas turbine not situated directly in the flow path of the operating medium is made possible by the fact that at least one air passage channel is formed in the shroud holding device, permitting a flow passage through the shroud holding device in the installed state of the guide blade. The resulting advantages are to be found in the preceding descriptions.

BRIEF DESCRIPTION OF THE DRAWINGS

Additional features of the present invention are derived from the claims, the exemplary embodiment and the drawings. The features and combinations of features defined in the description as well as the features and combination of features defined in the exemplary embodiment below are to be used not only in the particular combination given but also in other combinations without departing from the scope of the present invention.

FIG. 3 shows a top view of the guide blade segment and

FIG. 4 shows an enlarged frontal view of the shroud area IV shown in FIG. 3.

DETAILED DESCRIPTION

Figure 1:
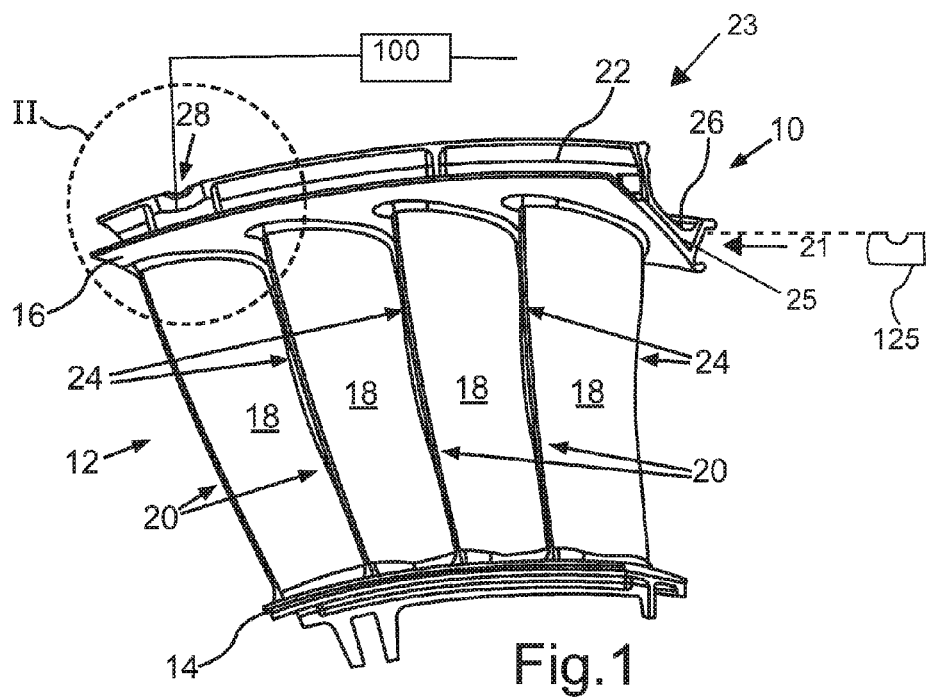
FIG. 1 shows a schematic perspective view of a guide blade segment including four guide blade segments according to the present invention for a housing of gas turbine.
Figure 2:
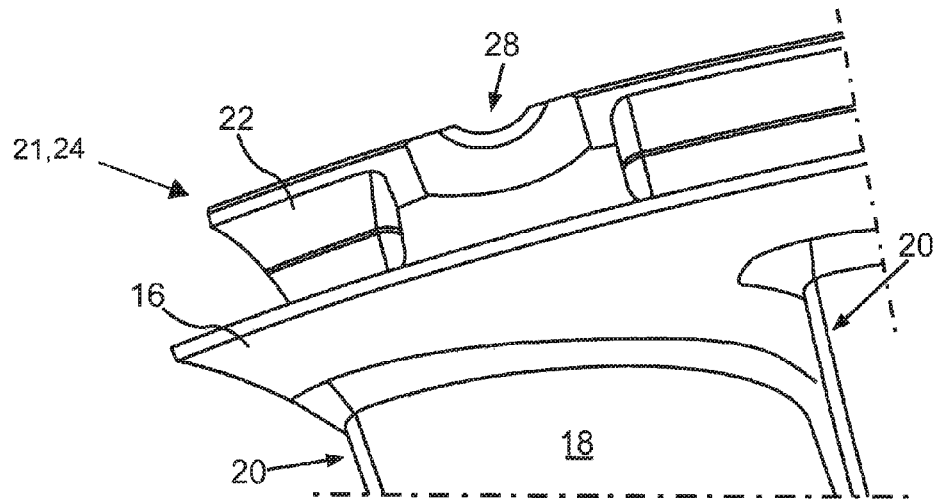
FIG. 2 shows an enlarged detail of a shroud area II shown in FIG. 1.

FIG. 1 shows a schematic perspective view of a guide blade segment 10 for a housing of a gas turbine designed as an aircraft engine and explained below in conjunction with FIG. 2, which shows an enlarged detail of a shroud area II shown in FIG. 1. Guide blade segment 10 here includes four guide blades 12 according to the present invention. Guide blades 12 include a shared radially inner shroud 14 and a shared radially outer shroud 16. Four turbine blades 18 of guide blades 12 extend between inner shroud 14 and outer shroud 16. Radially outer shroud 16 is part of a shroud configuration 21, shroud configuration 21 additionally including a shroud holding device 23 with the aid of which shroud 16 and the entire guide blade segment 10 may be secured on the housing of the gas turbine. Shroud holding device 23 therefore includes a shroud hook 22 situated in the area of profile inlet edges 20 of turbine blades 18 on the side facing away from turbine blades 18 and a shroud hook 26 situated in the area of profile outlet edges 24 of turbine blades 18. To set a controlled air throughput during operation of the aircraft engine, shroud hook 22 includes an air passage channel 28. It is apparent here that air passage channel 28, which may also be referred to as a "fingernail slot," is designed essentially in the form of a trough having a circular arc-shaped cross section. The air throughput, which is adjustable with the aid of air passage channel 28 in the area of outer shroud 16, may be used within the housing for gas admission and for cooling of housing components situated downstream in the direction of flow, such as following guide blade stages and the like. For this purpose, the housing may include, for example, a gas guidance system 100, shown schematically, with the aid of which gas passing through air passage channel 28 during operation of the gas turbine is guided to housing components which are situated downstream from air passage channel 28 with respect to a predefined direction of flow of the housing. In addition to a targeted adjustability of the air throughput during operation of the aircraft engine, air passage channel 28 also advantageously ensures a reduction in the stress concentrations on shroud configuration 21. A particularly effective reduction in stress concentrations is achieved in particular by air passage channels 28 having a round, elliptical, ring segment or elliptical-segment-shaped cross section. However, it should be emphasized that the geometry of air passage channel 28 is fundamentally unlimited. In addition, it may be provided that air passage channel 28 designed on the left edge of guide blade segment 10 is designed in another position, for example, at the center or on the right edge of guide blade segment 10 and/or that only some of guide blades 12 or guide blade segments 28 installed in the housing include an air passage channel 28 and/or that guide blade segment 10 includes multiple air passage channels 28. Guide blade segment 10 shown here is manufactured in one piece by master forming. Alternatively, for example, it may also be provided for guide blades 12 to be manufactured individually and assembled to form guide blade segment 10 or a complete guide blade ring and subsequently welded together.

FIG. 1 also shows a side groove 25 extending on the side of shroud holding device 23 from upstream shroud hook 22 over a subarea of shroud 16 to downstream shroud hook 26. A part of shroud holding device 23, such as, for example, a sealing plate 125, shown schematically, may be inserted in a form-locked manner into groove 25. This makes it possible to join neighboring shroud holding devices 23 and guide blade segments 10 in a type of tongue-and-groove connection. It may be provided that, alternatively or in addition to one of shrouds hooks 22, 26, the sealing element also includes an air passage channel 28 through which the air throughput takes place in the connecting area of two guide blades 12 or guide blade segments 10. However, it should be noted that air passage channel 28 should be designed only in those areas of the sealing element which come to lie in the area of one of shroud hooks 22, 26 in the installed state of the sealing element. In other words, the sealing element should not be designed in such a way that hot gases, for example, are able to pass between adjacent shrouds 16.

FIG. 3 shows a top view of guide blade segment 10. It is apparent that shroud hook 26 which is situated downstream in the direction of flow does not have an air passage channel 28, in contrast with upstream shroud hook 22. However, it should be emphasized that downstream shroud hook 26 may fundamentally also include one or multiple air passage channels to adjust the air throughput. In addition, it is apparent that a reinforcing structure 30, which is elevated in relation to the surface of shroud 16, is formed between shroud hooks 22, 26.

FIG. 4 shows an enlarged frontal view of shroud area IV shown in FIG. 3. This shows in particular the circular arc-shaped cross-section geometry of air passage channel 28 in shroud hook 22. An alternative design of air passage channel 28 is indicated by reference numeral 28' which has a rectangular cross-section geometry. The alternative embodiment of air passage channel 28' would allow a greater air throughput accordingly due to its larger cross-sectional area in comparison with the trough-shaped air passage channel 28.

What is claimed is:

1. A gas turbine comprising:
    a housing; and
    at least one guide blade situated in the housing, the guide blade including a shroud configuration having a radially outer shroud and a shroud holding device, and including a turbine blade extending radially inward from the shroud configuration;
    the shroud holding device having at least one shroud hook on a side of the shroud opposite the turbine blade, the radially outer shroud being secured on the housing with the aid of the shroud hook, the shroud hook being situated in an area of a profile inlet edge of the turbine blade and including at least one air passage channel allowing a flow passage through the shroud holding device.

2. The gas turbine as recited in claim 1 wherein the air passage channel is designed in the form of a slit and/or having a cross section in the form of a circular arc and/or an elliptical arc and/or is rectangular and/or circular and/or elliptical in at least some areas.

3. The gas turbine as recited in claim 1 wherein the shroud configuration is designed in one piece with the turbine blade and/or is attached to the turbine blade.

4. The gas turbine as recited in claim 1 wherein the at least one guide blade includes a plurality of guide blades connected to one another via respective shroud configurations to form a guide blade segment and/or a guide blade ring.

5. The gas turbine as recited in claim 4 wherein at least two adjacent shroud holding devices each include a respective groove connected by a sealing element in a form-locked manner.

6. The gas turbine as recited in claim 5 wherein the sealing element has at least one air passage channel.

7. The gas turbine as recited in claim 1 wherein the housing includes a gas guidance system with the aid of which gas passing through the air passage channel during operation of the gas turbine is guided to housing components which are situated downstream from the air passage channel with respect to a predefined direction of flow of the housing.

8. The gas turbine as recited in claim 1 wherein the at least one guide blade is situated in the area of a compressor and/or in the area of a turbine.

9. An aircraft engine comprising the gas turbine as recited in claim 1.

10. A guide blade for placement on a housing of a gas turbine, comprising:
    a shroud configuration having a radially outer shroud in the installed state and having a shroud holding device with the aid of which the shroud is securable on the housing; and
    a turbine blade extending radially inward from the shroud configuration,
    the shroud holding device having at least one shroud hook on a side of the shroud opposite the turbine blade, the radially outer shroud being secured on the housing with the aid of the shroud hook, the shroud hook being situated in an area of a profile inlet edge of the turbine blade and including at least one air passage channel allowing a flow passage through the shroud holding device.

11. The guide blade as recited in claim 10 wherein the guide blade together with at least one additional guide blade forms a guide blade segment.

12. The guide blade as recited in claim 11 wherein the at least one addition guide blade includes three guide blades.

13. A method for manufacturing a guide blade for a housing of a gas turbine, the guide blade including a shroud configuration having a radially outer shroud in the installed state and having a shroud holding device with the aid of which the shroud is securable on the housing; the guide blade including a turbine blade extending radially inward from the shroud configuration, the method comprising:
    forming at least one air passage channel in the shroud holding device for permitting a flow passage through the shroud holding device in the installed state of the guide blade,
    the shroud holding device including at least one shroud hook on a side of the shroud opposite the turbine blade, with the aid of which the shroud is secured on the housing, and the shroud hook, which is situated in the area of a profile inlet edge of the turbine blade, including the air passage channel.

* * * * *